US012266330B2

(12) United States Patent
Belikov et al.

(10) Patent No.: US 12,266,330 B2
(45) Date of Patent: Apr. 1, 2025

(54) GENERATING MUSIC ACCOMPANIMENT

(71) Applicant: MACDOUGAL STREET TECHNOLOGY, INC., New Paltz, NY (US)

(72) Inventors: Ilia Belikov, Dilijan (AM); Aleksandr Alekseev, Erlangen (DE); Vazgen Hakobjanyan, Yerevan (AM); Robert Joseph Pfeifer, New Paltz, NY (US)

(73) Assignee: MacDougal Street Technology, Inc., New Paltz, NY (US)

( * ) Notice: Subject to any disclaimer, the term of this patent is extended or adjusted under 35 U.S.C. 154(b) by 0 days.

(21) Appl. No.: 18/542,718

(22) Filed: Dec. 17, 2023

(65) Prior Publication Data
US 2024/0203387 A1 Jun. 20, 2024

Related U.S. Application Data

(60) Provisional application No. 63/465,470, filed on May 10, 2023, provisional application No. 63/433,908, filed on Dec. 20, 2022.

(51) Int. Cl.
*G10H 1/00* (2006.01)
*G06F 40/40* (2020.01)
*G10H 1/36* (2006.01)

(52) U.S. Cl.
CPC .......... *G10H 1/0025* (2013.01); *G06F 40/40* (2020.01); *G10H 1/0066* (2013.01); *G10H 1/361* (2013.01); *G10H 2210/005* (2013.01); *G10H 2210/111* (2013.01); *G10H 2210/391* (2013.01); *G10H 2240/311* (2013.01)

(58) Field of Classification Search
CPC .... G10H 1/0025; G10H 1/0066; G10H 1/361; G10H 2210/005; G10H 2210/111; G10H 2210/391; G10H 2240/311; G06F 40/40
See application file for complete search history.

(56) References Cited

U.S. PATENT DOCUMENTS

2009/0216354 A1 8/2009 Ong et al.
2018/0136350 A1 5/2018 Dell'Aversana et al.
(Continued)

FOREIGN PATENT DOCUMENTS

CA 3113775 A1 4/2020

OTHER PUBLICATIONS

Hsiao et al., "Compound Word Transformer: Learning to Compose Full-Song Music over Dynamic Directed Hypergraphs", Association for the Advancement of Artificial Intelligence (www.aaai.org), 2021 (Year: 2021).*

(Continued)

*Primary Examiner* — Jianchun Qin
(74) *Attorney, Agent, or Firm* — ARLUYS IP, P.C.

(57) ABSTRACT

Techniques are described for generating music data for accompaniment using machine learning (ML) techniques. In an implementation, MIDI-formatted music data is tokenized as a music token sequence. Based on the input music token sequence of a portion of an original music signal, a trained ML model generates an output music token sequence for a portion of a generated music signal. Such a portion of the generated music signal is temporally ahead of the portion of the original music signal, which was used to generate the portion of the generated music signal.

21 Claims, 8 Drawing Sheets

(56) References Cited

U.S. PATENT DOCUMENTS

| | | |
|---|---|---|
| 2018/0357990 A1 | 12/2018 | Goren et al. |
| 2021/0247954 A1 | 8/2021 | Balassanian |
| 2021/0248213 A1* | 8/2021 | Balassanian .......... G06F 16/683 |
| 2022/0044666 A1* | 2/2022 | Hsiao ....................... G10H 1/10 |
| 2022/0223125 A1 | 7/2022 | Zhou et al. |
| 2022/0383843 A1* | 12/2022 | Suzuki ..................... G10H 1/38 |
| 2023/0162712 A1* | 5/2023 | Suzuki ................. G10H 1/0008 84/609 |
| 2023/0377540 A1* | 11/2023 | Gover ...................... G10G 1/04 |

OTHER PUBLICATIONS

Guo et al., "MusIAC: An extensible generative framework for Music Infilling Applications with multi-level Control", In book: Artificial Intelligence in Music, Sound, Art and Design (pp. 341-356), 2022 (Year: 2022).*

Rachel M. Bittner et al., "A Lightweight Instrument-Agnostic Model for Polyphonic Note Transcription and Multipitch Estimation", 2022 IEEE International Conference on Acoustics, Speech and Signal Processing (ICASSP), May 2022.

Non-Final Office Action in U.S. Appl. No. 18/510,701 mailed on Jan. 19, 2024.

"PCT International Search Report" by United States Patent and Trademark Office (US) in Application No. PCT/US 23/84502, Filed Dec. 18, 2023, mailed Apr. 15, 2024, 2 pages.

International Claims examined by United States Patent and Trademark Office (US) in Application No. PCT/US 23/84502, Filed Dec. 18, 2023, 4 pages.

"PCT International Search Report" by United States Patent and Trademark Office (US) in Application No. PCT/US2024/055809, Filed Nov. 14, 2024, mailed Jan. 15, 2025, 2 pages.

International Claims examined by United States Patent and Trademark Office (US) in Application No. PCT/US2024/055809, Filed Nov. 14, 2024, 4 pages.

* cited by examiner

Message('note_on', channel=0, note=62, velocity=95, time=0),
Message('note_on', channel=0, note=60, velocity=95, time=0),
Message('note_on', channel=0, note=S4, velocity=95, time=0),
Message('note_on', channel=0, note=S0, velocity=95, time=0),
Message('note_off', channel=0, note=62, velocity=95, time=960),
Message('note_off', channel=0, note=60, velocity=95, time=0),
Message('note_off', channel=0, note=54, velocity=95, time=0),
Message('note_off', channel=0, note=50, velocity=95, time=0),
Message('note_on', channel=0, note=50, velocity=95, time=14400),
Message('note_on', channel=0, note=43, velocity=95, time=0),
Message('note_off', channel=0, note=50, velocity=95, time=640),
Message('note_off', channel=0, note=43, velocity=95, time=0),
Message('note_on', channel=0, note=S0, velocity=95, time=0),
Message('note_on', channel=0, note=43, velocity=95, time=0),
Message('note_off', channel=0, note=S0, velocity=95, time=320),
Message('note_off', channel=0, note=43, velocity=95, time=0),
Message('note_on', channel=0, note=52, velocity=95, time=0),
Message('note_on', channel=0, note=43, velocity=95, time=0),
Message('note_off', channel=0, note=S2, velocity=95, time=640),
Message('note_off', channel=0, note=43, velocity=95, time=0),

FIG. 2

GENERATING MUSIC ACCOMPANIMENT

BENEFIT CLAIM

This application claims the following benefits:
a) under 35 U.S.C. § 119(e) of provisional application 63/433,908, filed on Dec. 20, 2022, and
b) under 35 U.S.C. § 119(e) of provisional application 63/465,470, filed on May 10, 2023,
the entire contents each of which is hereby incorporated by reference for all purposes as if fully set forth herein.

FIELD OF THE TECHNOLOGY

The present invention relates to the field of audio processing, in particular, to generating music accompaniment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer systems are extensively used in audio processing. Acquisition of audio, editing, encoding, storage, decoding and reproduction are key functions performed by computers today. The computer tools performing these and other audio processing functions greatly improve the quality of music production and consumption.

While most audio processing capabilities have substantially advanced with the growth in computer-related technologies, the transformative and generative functions of audio processing, especially for music processing, have stayed limited in scope. Such functions mainly concentrate on improving the quality of existing music recordings or mixing existing sources of music. As such, digital music processing lacks tools that compose new music or at least aid in the composition of new music.

With the rise of artificial intelligence (AI) and the application of machine learning (ML) in many computer-related industries, approaches have been developed to generate music using AI. However, the current ML approaches are compute resource-intensive processing and are inaccurate.

First, any machine learning approach requires an ML model to be trained using existing large data sets of music data, and then only a trained ML model may be executed to generate music. According to one approach, to provide training data sets in which patterns may serve as the basis for generating music, the audio may first converted to a spectrum representation, spectrograms. However, when the spectrograms are fed into an ML algorithm to generate the trained ML model, the trained ML models may still yield inaccurate output due to inherent inaccuracies in the spectrograms (e.g., errors due to noise and information loss in transformation, particularly related to timing).

Secondly, the large ML models cannot be generated on computing resource-restrictive client computing devices such as personal laptops or smartphones. Even if the generation of the models is offloaded to cloud infrastructure, which may have practically unlimited resources, the generated audio model based on spectrograms or waveforms may still be too compute-intensive to run on client computing devices.

More importantly, for some music-generating tasks, particularly generating music accompaniment, the lag between the input and output of the ML model has to be minimal. Otherwise, the generated accompaniment would be out-of-synch (out-of-tune) with the music for which it is generated.

BRIEF DESCRIPTION OF THE DRAWINGS

In the drawings of certain implementations in which like reference numerals refer to corresponding parts throughout the figures:

FIG. 2 is a textual image that depicts an example of MIDI data;

DETAILED DESCRIPTION

Figure 1:
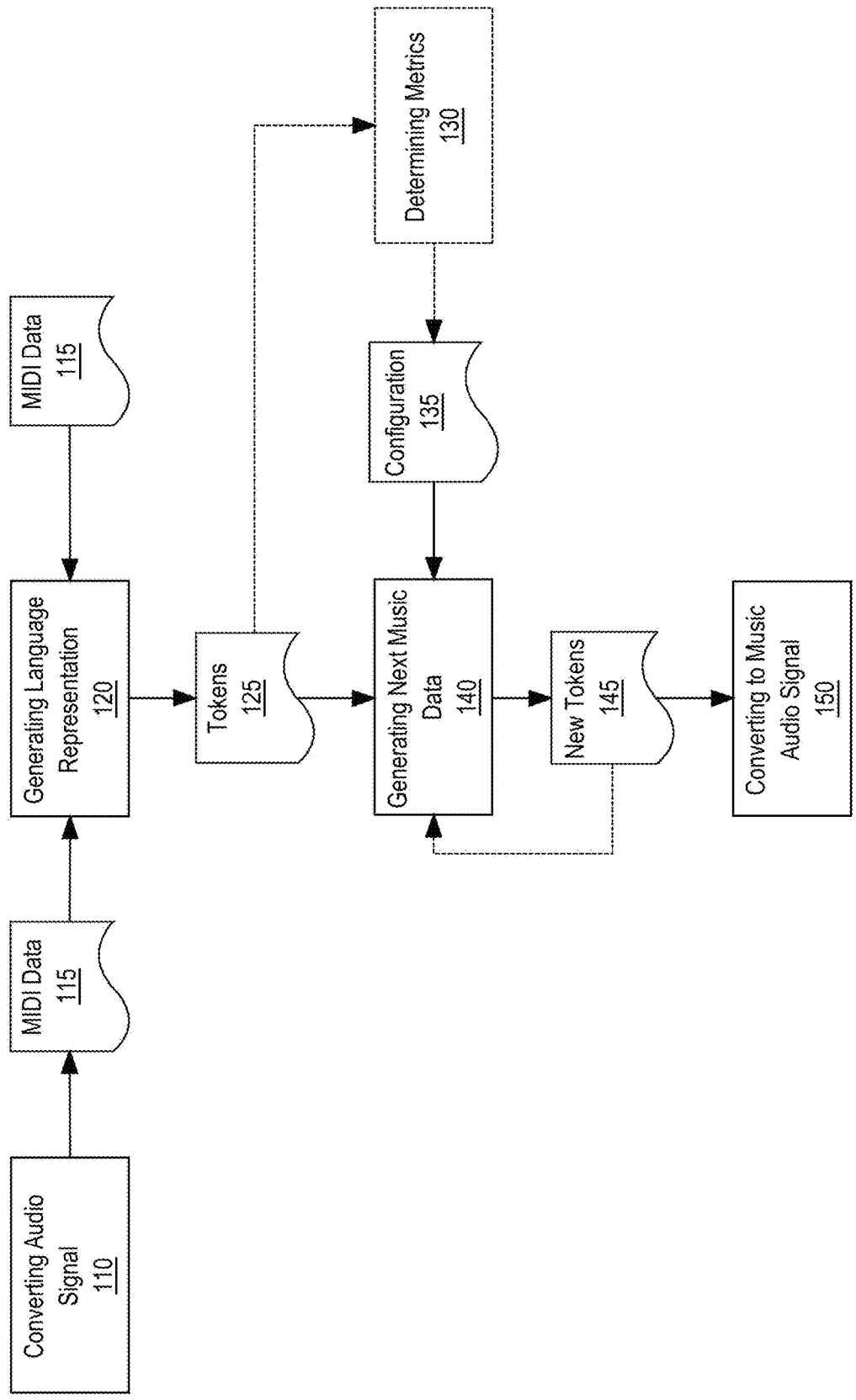
FIG. 1 is a block diagram that depicts data flow(s) for a generative music system, in an implementation.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe a generative music system that may continuously generate an audio signal based at least in part on input stream(s) of music data. The system may playback (or cause to playback) the generated music (audio) signal in parallel with the original input signal, on which the generated music signal is based. Accordingly, a user may produce music (e.g., playing a musical instrument) while the system acquires/receives the original music signal/music data and generates new music data. When the new music data is played back immediately after the generation, the new music provides to the original music what's colloquially referred to as "jamming" for the user.

Techniques described herein include tokenization of the input music data and generating a new (next) sequence of music tokens based on the music tokens of the input music. The generated sequence of music tokens may then be converted into an audio signal, which may be played back by the system.

In an implementation, the tokenization techniques are performed on MIDI-formatted data. The input music data is either directly received in MIDI (Musical Instrument Digital Interface) format or converted to a MIDI formatted music data, referred to herein as "MIDI data". The techniques for conversion of an audio signal into MIDI data are described in U.S. application Ser. No. 18/510,701, filed on Nov. 16, 2023, titled "Real-time Audio to Digital Music Note Conversion" and referred to herein "Audio to MIDI Application," the entire content of which is hereby incorporated by reference for all purposes as if fully set forth herein.

In an implementation, the input digital representation of music (e.g., MIDI data) is converted to a sequence of music tokens. The term "music token" refers herein to a token that represents a particular feature of music. Music tokens with timing relevance (e.g., representing events) are arranged in a sequence corresponding to their temporal occurrences within the signal.

Additionally or alternatively, music tokens include a separate token for the timing information. For example, a token may represent a particular time delay that indicates the time durations during which no additional event has occurred. Unlike MIDI format, in which each event contains its temporal information, music tokens indicate the event itself (e.g., a musical note ON or a musical note OFF), while a separate token represents the temporal information of the occurrence of the event (absolute timing information) or relative timing information).

In an implementation, a machine learning (ML) algorithm is trained using a training set of music token sequences to generate ML model(s) such as Large Language Models (LLMs), e.g., ChatGPT®. A sequence of music tokens, for which the temporally next sequence of music tokens is known, is provided to an ML model to generate the next sequence of music tokens. The generated sequence of the music tokens is compared to the known next temporal sequence to determine the error. Based on the error, the parameters of the ML model are modified. These steps may be repeated until the most accurate output sequence of tokens is produced and thereby, the trained ML model is generated.

Additional details on techniques for ML algorithms and models are described in the "GENERATING NEW MUSIC TOKENS," "OTHER MACHINE LEARNING TECHNIQUES," "MACHINE LEARNING ALGORITHMS AND DOMAINS," and "HYPER-PARAMETERS, CROSS-VALIDATION AND ALGORITHM SELECTION" sections.

During runtime, the system provides music token sequence(s) as input to a trained ML model. The ML model generates new music token sequence(s) predicting the music that may not yet have been received by the system. The trained ML model produces an accurate prediction of the music data because tokens not only represent music events but also separate tokens represent the delays between the music events. Accordingly, the trained ML model may accurately generate not only the musical notes to be played but may also accurately generate the timing at which each corresponding note is to be played. The new music token sequence(s) may then be converted to audio signals and played back.

However, by the time the new music token sequence(s) are generated, the music data for which the music token sequences were generated may have already been played back. Thus, the generated and current music data may still be out of sync. To rectify this, the previously generated music data, which is a prediction of what will be the next music input data is (partially) provided back as the new input to the ML model. Such a loop of music data may also increase the variance of the generated music from the input and generate accompaniment of various degrees. The degree of variance depends on the input ratio of the amount of system-received music token sequences to the amount of previously system-generated music token sequences.

For example, the ML model takes as input feature the newly generated music token sequence(s) in addition to newly received music token sequence(s) (e.g., from received MIDI data or captured audio signal(s)). Thereby, the trained ML model is used in at least a partial feedback loop, in which the newly generated music token sequence(s) are used again as input together with newly captured music token sequence(s). Because, in an implementation, the generated new music token sequence(s) are at least partially based on music token sequences that are a) different from the original and b) are at least themselves partially based on predicted temporally next tokens (future of the future), the music of the new token sequence should be in sync with the original music but be also a derivative (accompaniment) of the music.

In an implementation, different ML models may be trained for different types of music tokens. In particular, a separate ML model may be trained to predict the metrics of the generated music, such as polyphony and/or intensity. The term "polyphony" refers to the maximum number of different music notes concurrently being in the ON state in a music token sequence. The ON state is described by a note having a note ON event token in the music token sequence without having a correspondent note OFF event token for the note for the duration of the state. The term "intensity" refers to the maximum number of different music notes having an ON state but not necessarily concurrently within a particular time period (e.g., a bar).

Additionally, or alternatively, the intensity and/or polyphony of the generated music data may be configured by the user. The polyphony and intensity (either determined by an ML Model or configured by the user) may condition the ML model for generating music tokens for the output signal. The ML model may be trained to take as input polyphony and/or intensity and, based on polyphony and/or intensity, generate music tokens. Accordingly, the same ML model with the same music token sequence(s) may generate different music data based on different polyphonies and/or intensities.

Audio Signal to Digital Representation

FIG. 1 is a block diagram that depicts data flow(s) for a generative audio system, in an implementation. At block 110, a user-generated music signal is converted to a digital audio signal representation such as MIDI data 115. Techniques for converting an audio signal to MIDI data are described in Audio to MIDI Application. Accordingly, the execution of block 110 generates real-time MIDI data 115 of the user-generated music signal. The user-generated music signal may be generated by one or more musical instruments and/or vocal performances as non-limited examples.

The MIDI formatted data, such as MIDI data 115, fully describes music in musical notes, digitalizing the music sheet for a composition. MIDI is a standard of digital music representation in computational systems and describes a communications protocol, digital interface, and electrical connectors that connect a wide variety of electronic musical instruments, computers, and related audio devices for playing, editing, and recording music. MIDI standard includes textual notations representing various events analogous to playing notes of a music sheet. Further details on MIDI format and its data may be found in the Audio to MIDI Application. Although the examples and implementations herein refer to MIDI format and its data as the digital musical note representation, however, the exact input format used to digitally represent musical notes is not critical to the techniques described herein.

Additionally or alternatively, MIDI data 115 may be received directly from a user device. For example, a user guitar may include a MIDI pickup device that will real-time convert the played music into MIDI data 115 or the synthesizer may directly generate MIDI data 115. Such user devices may be communicatively coupled to the system, and the system receives MIDI data 115 without any need for conversion.

FIG. 2 is a textual image that depicts an example of MIDI data. MIDI data includes messages, each of which may describe an event. A note started playing event or a note stopped playing event, referred to as a MIDI note ON event and a MIDI note OFF event, respectively, may describe the note identifier ("note"), the track identifier ("channel"), and timing information ("time").

Music Tokenization

Large language models are trained on and operated using tokens that are retrieved from the input natural language. In the case of natural language, a token may be a string that is between a letter and a word, like a syllable. Because a MIDI event aggregates multiple pieces of information, using MIDI event representation as is would create inherent complexity and inaccuracy in the output of the LLM, which expects tokenized input. To use LLMs for predicting the next music events, MIDI events are converted into music tokens, in an implementation. Continuing with FIG. 1, at block 120, the input stream(s) of MIDI data are converted to a sequence of music tokens 125.

Each MIDI event type is converted to a corresponding music token. For example, the MIDI message of note ON for a particular music note is converted to a note ON token having the value of the particular note, and the MIDI message of note OFF for a particular music note is converted to a note OFF token having the value of the particular note. The music tokens for events are serially arranged in the same sequence as the corresponding MIDI event messages.

The timing information of the MIDI events may also be tokenized. In general, LLM tokens for natural language are arranged in the sequential information flow in a textual format. Such a representation fails to take into account temporal information. For that reason, the temporal information is also tokenized and inserted into the music token sequence at an appropriate location.

In an implementation, in addition to event information, such as the note being played or stopped, music tokens indicating temporal information are also generated. Accordingly, an LLM may predict not only whether a note is playing or not but also when and for how long the note was ON or OFF.

Additionally, or alternatively, music tokens are arranged in a temporal grid corresponding to a user-configurable "beat" (time period at which music may be made repeatable). The time period based on a beat is referred to herein as a bar (e.g., 4 beats per bar). For example, a bar start token and/or a bar end token are inserted into the music token sequence at the appropriate location of the bar start and end, respectively.

In an implementation, each bar is divided into a grid of equal time-period indicators referred to herein as a bar grid unit. The timing music token may have the value of the number of bar grid units for the time period of the adjacent events (relative time information) or the number of bar grid units from the start of a bar to the event to occur (absolute time information).

In an implementation, music event tokens are adjusted to represent the event occurring at the closest grid unit of a bar. The MIDI data specified time is converted to the closest grid unit of the bar to determine the timing music token to be generated for the music event token. The "time" property in the MIDI event message specifies the amount of time passed since the previous message (see FIG. 2) in ticks. MIDI data specifies the exact tick resolution used for a bar. If the tick resolution is the same as the grid unit resolution, then the value of the time property of the event in MIDI data may be used for the timing music token. If the tick resolution is different from the bar grid unit resolution, then the time property of MIDI data is converted to the closest bar grid unit. The value is then assigned to the time music token.

In an implementation, input music data representation may have multiple tracks for different types of music sources (e.g., soprano voice, alt voice, and different instruments). Input MIDI data may contain a separate stream of MIDI event messages for each of the different music sources and may indicate the type of music source. Such separate sequences of messages may be received by the system in parallel from different sources. For example, different microphones may be attached to different instruments/persons, and different electrical instruments may produce their corresponding different MIDI data streams.

Figure 3:
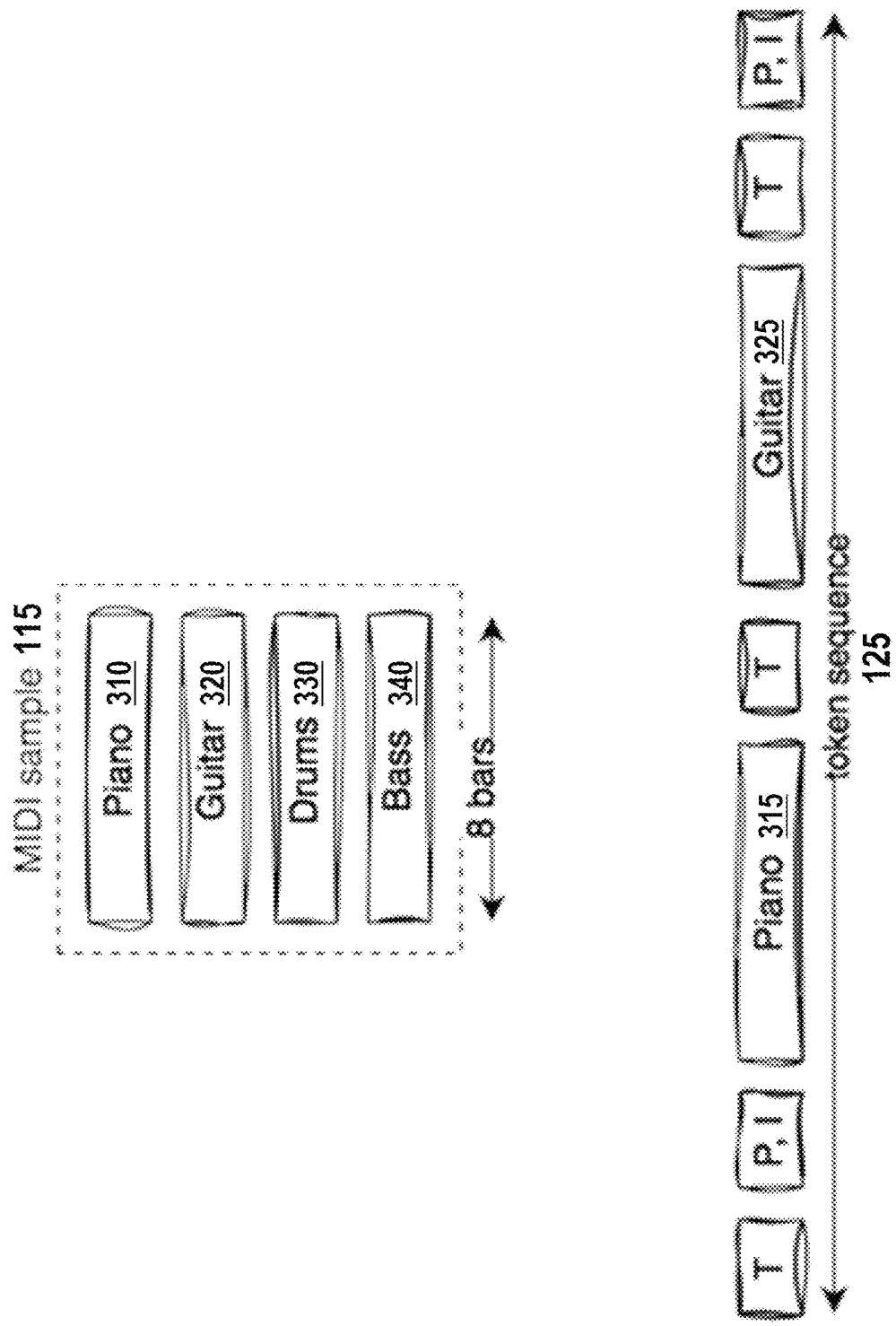
FIG. 3 is a block diagram depicting the tokenization of music data streams from different music sources, in an implementation.

FIG. 3 is a block diagram depicting tokenization of music data streams from different sources, in an implementation. MIDI Sample Data 115 received by the system includes four tracks/channels. For each channel, separate MIDI data is received containing 8 bars of Piano MIDI Track Data 310, Guitar MIDI Track Data 320, Drums MIDI Track Data 330, and Bass MIDI Track Data 340.

In this example, the system may convert the received MIDI Sample Data 115 to the configured number of token sequence bars. If the system is configured to process MIDI Sample 115 with 4 bars at a time, then the system will tokenize the first 4 bars of each track in MIDI Sample 115 and then the next 4 bars of MIDI Sample Data 115.

In an implementation, when the system identifies a track in MIDI data (for example, after the configured number of bars have been processed in the current track and the system switches to the next track), the system generates a token representing a start to the track. The start of the track token is followed by tokens representing the metadata of the track.

In an implementation, the metadata of the track includes the music source type of the track (e.g., a musical instrument or voice type.) The system maps the music source type identified in the MIDI track to the music source type identifier for the instrument token. In an implementation, the system may map multiple music source types in MIDI data to a single music source type in the music token sequence. For example, multiple types of guitars (e.g., MIDI's Acoustic Nylon Guitar, Acoustic Steel Guitar, Electric Guitar, Electric Clean Guitar, Electric Muted Guitar, Overdriven Guitar, Distortion Guitar, and Guitar Harmonics) may be mapped to a guitar-type music source in the music token sequence.

Additionally or alternatively, the track metadata may indicate the metric value(s) for the music of the MIDI data. The metrics in the metadata may include polyphony and/or intensity for the track. To determine the polyphony from the MIDI data of the track, the system may compute an average (or any other statistical aggregate function) number of notes playing during a single MIDI tick to determine the polyphony. To calculate the intensity per bar (or any other time period), the system may calculate the total number of notes in the sequence for that time period divided by polyphony. The system generates tokens for polyphony and/or intensity as the track metadata and inserts it after the track start indication, in an implementation.

Below is an example of a music token sequence generated for a bar in a track in example MIDI data. The example is for a track with the musical instrument indicator 30 (e.g., piano). After the TRACK_START token indicating the start of the track for the piano is generated, the determined track metadata is inserted into the token sequence: "INT=4" for the intensity of value of 4, and "POL=2" for polyphony with the value of 2.

The "BAR_START" and "BAR_END" tokens represent the start and the end of the first bar for the track. In a multi-track MIDI sample, the number of bars of the track that are generated before generating tokens for the next track depends on the configuration of the system. If the system is configured for processing 4 bars at a time, then 4 bars of track for piano are generated before the system proceeds to the next guitar track to generate the 4 bars. Similarly, for 8 bars, the system generates the full 8 bars of Piano MIDI Track 310, such as Piano Token Track 315, before proceeding to generate the 8 bars of Guitar MIDI Track 320 to yield Guitar Token Trak 325.

Between the "BAR_START" and "BAR_END" tokens, the system generates the music event tokens, "NOTE_ON" and "NOTE_OFF" and timing tokens "TIME_DELTA" based on MIDI event messages of the track for that particular bar. In the below example, musical notes #57 and #53 are played right at the start of the bar, 20 bar grid units later, musical notes #41 and #48 are played, and 6 grid units later, musical note #57 is stopped playing.

TRACK_START INT=4 POL=2 INSTR=30
  BAR_START
NOTE_ON=57 NOTE_ON=53 TIME_DELTA=20
NOTE_ON=41 NOTE_ON=48 TIME_DELTA=6
NOTE_OFF=57 . . . BAR_END . . . .

Continuing with the 8-bar track example in FIG. 3, token sequence 325 is generated (drum and bass token sequences are not depicted).

Generating New Music Tokens

Continuing with FIG. 1, at block 140, token sequences of the original music are used to generate new music token sequences that represent a new music that may play as an accompaniment to the original music. In an implementation, machine learning techniques are used to generate new music token sequences 145 based on token sequences 125. Machine learning techniques include applying a machine learning algorithm on a training data set of music token sequences, for which outcome(s), the next music token sequences are known, with initialized parameters whose values are modified in each training iteration to more accurately yield the known outcome(s) (referred herein as "label(s)").

The term "machine learning algorithm" (or simply "algorithm") refers herein to a process or set of rules to be followed in calculations in which a model artifact, comprising one or more parameters for the calculations, is unknown. The term "machine learning model" (or simply "model") refers herein to the process or set of rules to be followed in the calculations in which the model artifact, comprising one or more parameters, is known and has been derived based on the training of the respective machine learning algorithm using one or more training data sets. Once trained, the input is applied to the machine learning model to make a prediction, which may also be referred to herein as a predicted outcome or output.

In an implementation, the system may be configured for a machine learning model to use a particular number of bars of the music token sequence to produce the next music token sequence of the particular number of bars. Therefore, the machine learning algorithm may also be trained using the same length of music token sequences in each training iteration. For example, 4-track 8-bar sample music token sequences are passed through the machine learning algorithm. The tracks may be picked randomly, each track representing a different type of music source (e.g. different musical instrument).

The machine learning algorithm predicts the next token probability for a given set of parameter values. For example, at each iteration, the ML model is trained to generate an array containing probabilities for each token in the token dictionary. The probability describes the likelihood of the corresponding token being the next token given the current parameter values. The music token vocabulary may include all possible types of MIDI events and may be the size of 300-500 tokens. In an implementation, the parameters of the ML model are optimized at each iteration using a cross-entropy loss function.

Based on such application(s) of the training data set(s), the techniques generate a machine-learning model with known parameters. Thus, a machine learning model includes a model data representation or model artifact. A model artifact comprises parameter values, which are applied by a machine learning algorithm to the input to generate a predicted output. Training a machine learning model entails determining the parameter values of the model artifact. The structure and organization of the parameter values depend on the machine learning algorithm.

Expected Music Metrics

Continuing with FIG. 1, the system may determine expected music metrics such as polyphony and/or intensity based on tokens 125 at block 130. The expected music metrics are used in configuration 135 to condition the ML model for generating new music tokens.

In an implementation, the system may include a trained machine-learning model for determining the expected music metrics for new (not yet generated) music tokens. Such a machine learning model is similarly trained by a training set of music token sequences with known music metric label values.

The system may receive the first music token sequence(s) (e.g., 8 bars of multiple tracks) and use the trained metric machine learning model to determine the probabilities of the expected metric(s) for each track. The expected metric value with the highest probability is selected for each track.

To ensure that the generated music data complies with the expected music metrics, the new token generation ML is configured with the determined metric value(s). Since the music token generation ML model has been trained with the training set data that included tokens for the metrics, the token generation ML model has an inherent dependency between the metric values and the generation of the new music event tokens. Accordingly, once the music token generation ML model is configured with the expected metrics, the new music tokens generated are according to the expected music metrics.

For example, the expected music metric model may generate probabilities for polyphony values 1-10 and intensity values 1-5 using the first input number of bars of tracks. Based on the highest probability values, the system selects the expected polyphony and the expected intensity metric values. The system then configures the LLM with the expected polyphony and intensity metric values. When the first and subsequent token sequences are fed into the configured LLM, the LLM generates new music token sequences that indicate music events in accordance with the polyphony and intensity levels.

In another implementation, the system may receive the expected metric values that may be user-configurable (e.g., received from a user device). Accordingly, block 130 for determining music metrics may not be executed. The music token generation machine learning model is configured by configuration 135, which would include the expected metric value(s) received from the user device.

Generating New Music Signal

Continuing with FIG. 1, at block 140, the system generates new music token sequences 145 based on original music token sequences 125. The new music token sequences 145 may be converted to a music audio signal at block 150. While MIDI data 115 is continuously received (originating from continuous music audio capture), the new music signal may be continuously (caused to be) generated based on the continuously generated new token sequences 145. The system may be configured to generate the next music token sequences for a particular time period at a time (e.g., 4 bars or 8 bars at a time) at block 140. Additionally, the system may be configured based on configuration 135 with intensity and polyphony configuration values to generate new music tokens for a particular density of note ON states (intensity) or parallelism (polyphony) in a number of simultaneous note ON states represented with the corresponding tokens.

Figure 4:
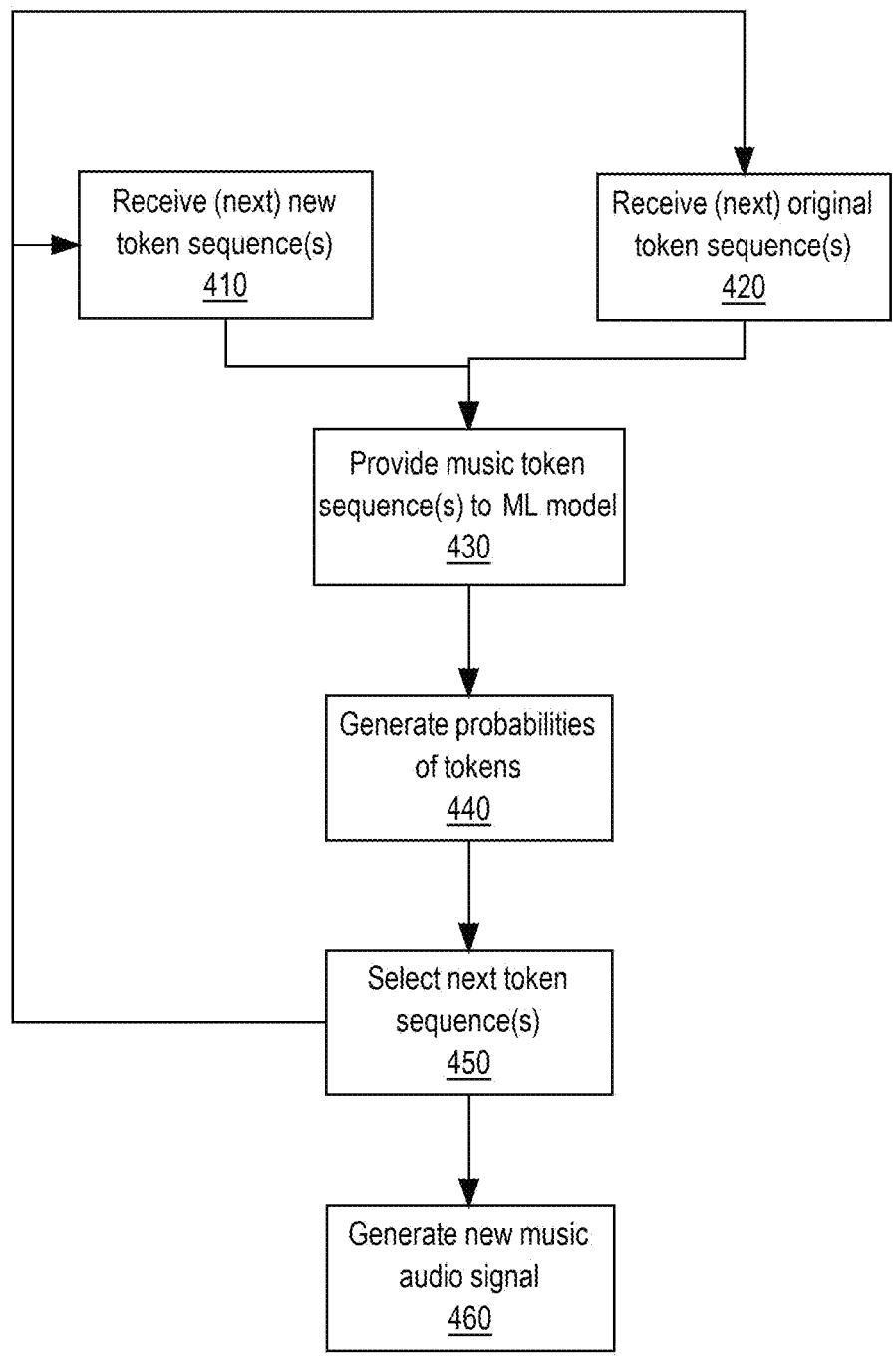
FIG. 4 is a flow diagram that depicts a process of generating new music token sequences, in an implementation.

FIG. 4 is a flow diagram that depicts a process of generating new music token sequences, in an implementation. At step 420, the system receives the first set of original music token sequences tokenized from MIDI data. At step 430, at the first iteration, no new music token is yet generated. Thus, the system provides the configured amount of music token sequences from the received original music token sequences to the music token generation ML model, which generates the probabilities for new music token sequences. The configured amount may be a particular number of bars per track of music tokens.

At step 440, the ML model generates the probabilities for each music token to be the next music token given the provided music token sequence(s). The ML model may generate the probabilities for each music token for each sequence corresponding to the input sequence (e.g., each bar). In an implementation, the ML model generates probabilities for each token/value combination that represents a unique music event and for all the permutations of timing values. The probabilities for non-event tokens, such as the tokens for track/bar separators and metadata, may be omitted from the generation. Accordingly, the ML model may generate a set of probabilities that contains a probability for each supported note's on and off event tokens and probabilities for timing tokens representing delays from one grid unit up to a full bar.

At step 450, tokens for the next music token sequences are selected based on the generated corresponding probabilities. The system may drop possible next tokens, which may cause the sequence to repeat itself. The system may perform sampling on (the rest of) the tokens by picking a number of most probable continuations out of the probability distribution and comparing the overall probability of possible generated sequences. If the ML model is configured to generate a single probability set for multiple bars of input, at step 440, the system may determine where in the sequence of selected new tokens to split for generating a sequence of tokens per bar.

At step 460, the system may generate an audio signal based on the new music token sequences. Additionally or alternatively, the system may convert music tokens to MIDI data and provide this output MIDI data to communicatively coupled device(s) for playback. Accordingly, the system generates or causes to generate a music accompaniment to the original music based on the original music signal itself.

Variation of New Music Signal

The system may vary the new music data to cause the new music signal to be different from the original music signal at different degrees of variance. Continuing with FIG. 1, the system may be configured to generate music token sequences at block 140 based on newly generated token sequences 145 (or a portion thereof) in addition to original tokens 125. The configuration for the amount of variation or mixing original token sequences 125 with newly generated token sequences 145 is referred to herein as "variance" or "variance level." The variance may be set in percentage (relative) of new token sequences to use as input for block 140 or in the number of bars (absolute) from new token sequences to use as input for block 140.

Continuing with FIG. 4, in an implementation, after step 450, the process may proceed back to step 420 to process the next original music token sequences. For the second iteration and thereafter, new music token sequences have already been generated. Thus, at step 410, the system may receive the last iteration's generated music token sequence(s).

For the second and subsequent iterations, at step 430, the system may variate the input and thereby introduce variance in the output by providing the new music token sequence(s) generated at the previous iteration along with the original music token sequence(s).

Figure 5A:
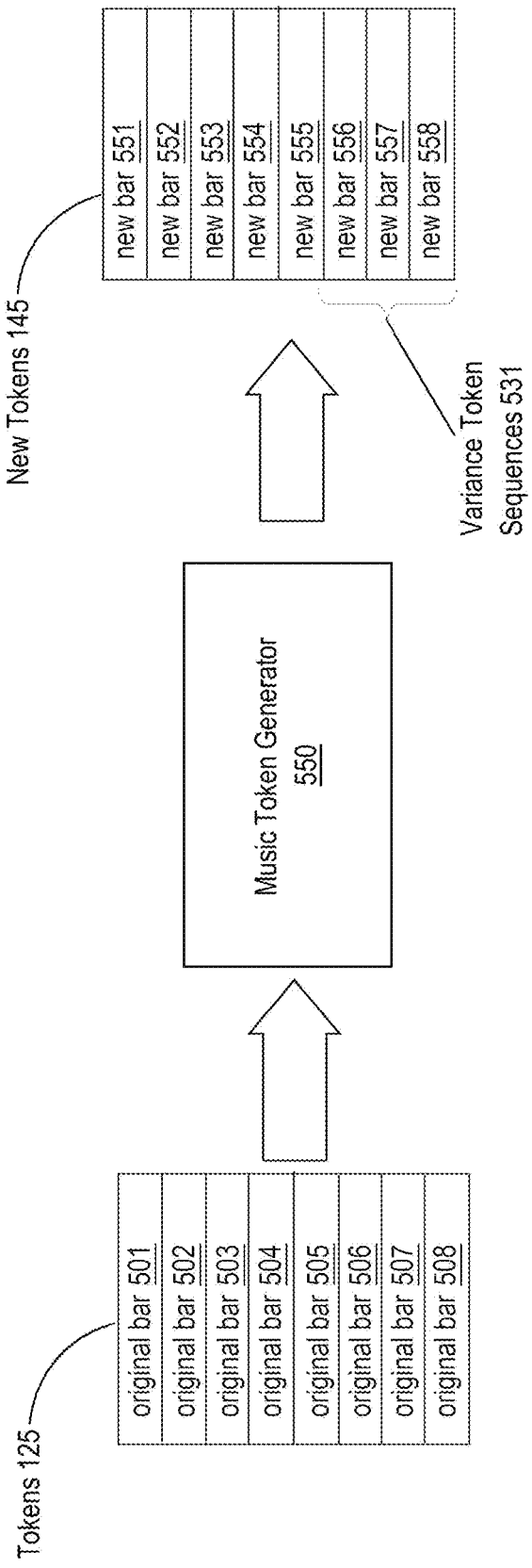
FIGS. 5A and 5B are block diagrams that depict an example of a variation, in an implementation.
Figure 5B:
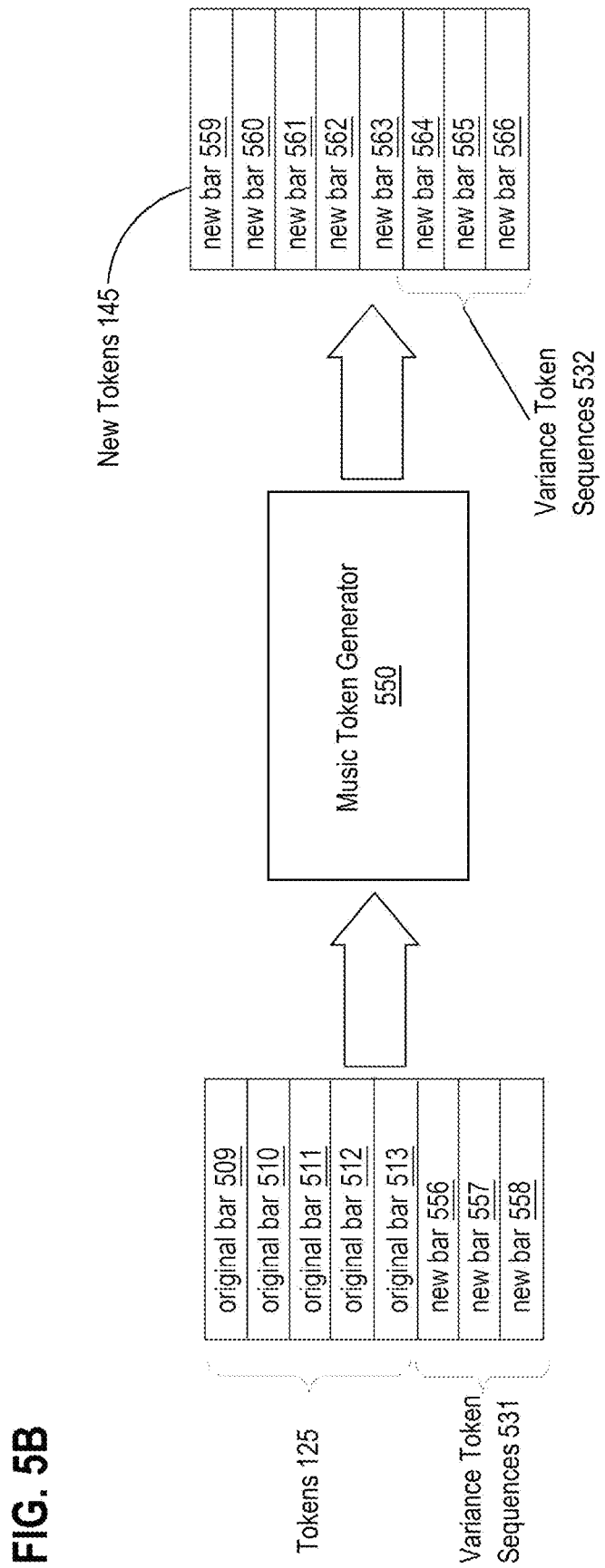

FIGS. 5A and 5B are block diagrams that depict an example of variation, in an implementation. In the examples of FIGS. 5A and 5B, Music Token Generator 550, corresponding to operation block 140 of FIG. 1, is configured to take as input 8 bars of original music token sequences to produce 8 bars of new music token sequences. The system is configured to have ⅜ variation, i.e., to provide at least 3 out of 8 bars of the input with the previously generated new music token sequences.

FIG. 5A depicts an example of the first iteration. Since no new music token has been yet generated, the system provides Music Token Generator 550 the original music tokens, original bars 501 (earliest) through 508 (latest). Music Token Generator 550 generates the corresponding new music tokens, new bar 551 through new bar 558.

In an implementation, the system may select one or more new music token sequences as input at random or temporally (selecting the earliest or the latest music token sequences). Continuing with FIG. 5A example, the system selects Variance Token Sequences 531 that include, according to the variance configuration, 3 new bar music token sequences 556-558 for re-input from 8 new bar music token sequences 551-558. The selection is based on new bar music token sequences 551-558 being temporally the latest.

FIG. 5B depicts an example of the next iteration. Rather than the input music token sequence being all original token sequences from tokens data 125, the input includes Variance Token Sequence 531 of FIG. 5A. Accordingly, the next original bar music token sequences 509-513 are provided to Music Token Generator 550 along with new bar 556-558, which were generated by Music Token Generator 550 in the previous iteration.

The generated token sequences, new bar sequences 559-566, have been now varied by having 3 non-original music token sequences at the input of Music Token Generator 550. For the next iteration, the 3 non-original music token sequences are Variance Token Sequences 532.

Accordingly, in such an implementation, the new music data produced at each iteration is different from the original music data because non-original music token sequences are (at least partially) used. At the same time, the new music data continues to be based on the original music data, and thus, the produced new music signal is the original music signal's accompaniment. Additionally, when the input is based on the latest of the new music token sequences, the generated new music produced from the new music data should have minimal or no lag with the original music.

Other Machine Learning Training Techniques

In supervised training, training data is used by a supervised training algorithm to train a machine learning model. The training data includes input and "known" output labels. In an implementation, the supervised training algorithm is an iterative procedure. In each iteration, the machine learning algorithm applies the model artifact and the input to generate a predicted output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the parameter values of the model artifact are adjusted. The iterations may be repeated until the desired accuracy is achieved or some other criteria are met.

In an implementation, to iteratively train an algorithm to generate a trained model, a training data set may be arranged such that each row of the data set is input to a machine learning algorithm and further stores the corresponding actual outcome, label value, for the row. For example, each row of the adult income data set represents a particular adult for whom the outcome is known, such as whether the adult has a gross income over $500,000. Each column of the adult training dataset contains numerical representations of a particular adult characteristic (e.g., whether an adult has a college degree, age of an adult . . . ) based on which the algorithm, when trained, can accurately predict whether any adult (even one who has not been described by the training data set) has a gross income over $500,000.

The row values of a training data set may be provided as inputs to a machine learning algorithm and may be modified based on one or more parameters of the algorithm to yield a predicted outcome. The predicted outcome for a row is compared with the label value, and based on the difference, an error value is calculated. One or more error values for the batch of rows are used in a statistical aggregate function to calculate an error value for the batch. The "loss" term refers to an error value for a batch of rows.

At each training iteration, based on one or more predicted values, the corresponding loss values for the iteration are calculated. For the next training iteration, one or more parameters are modified to reduce the loss based on the current loss. Any number of iterations on a training data set may be performed to reduce the loss. The training iterations using a training data set may be stopped when the change in the losses between the iterations is within a threshold. In other words, the iterations are stopped when the loss for different iterations is substantially the same.

After the training iterations, the generated machine learning model includes the machine learning algorithm with the model artifact that yielded the smallest loss.

For example, the above-mentioned adult income data set may be iterated using the Support Vector Machines (SVM) algorithm to train an SVM-based model for the adult income data set. Each row of the adult data set is provided as an input to the SVM algorithm, and the result, the predicted outcome, of the SVM algorithm is compared to the actual outcome for the row to determine the loss. Based on the loss, the parameters of the SMV are modified. The next row is provided to the SVM algorithm with the modified parameters to yield the next row's predicted outcome. The process may be repeated until the difference in loss values of the previous iteration and the current iteration is below a pre-defined threshold or, in some implementations, until the difference between the smallest loss value achieved and the current iteration's loss is below a pre-defined threshold.

Once the machine learning model for the machine learning algorithm is determined, a new data set for which an outcome is unknown may be used as input to the model to calculate the predicted outcome(s) for the new data set.

In a software implementation, when a machine learning model is referred to as receiving an input, executing, and/or generating output or prediction, a computer system process executing a machine learning algorithm applies the model artifact against the input to generate predicted output. A computer system process executes a machine learning algorithm by executing software configured to cause the execution of the algorithm.

Machine Learning Algorithms and Domains

A machine learning algorithm may be selected based on the domain of the problem and the intended type of outcome required by the problem. The non-limiting examples of algorithm outcome types may be discrete values for problems in the classification domain, continuous values for problems in the regression domain, or anomaly detection problems in the clustering domain.

However, even for a particular domain, there are many algorithms to choose from for selecting the most accurate algorithm to solve a given problem. As non-limiting examples, in a classification domain, Support Vector Machines (SVM), Random Forests (RF), Decision Trees (DT), Bayesian networks (BN), stochastic algorithms such as genetic algorithms (GA), or connectionist topologies such as artificial neural networks (ANN) may be used.

Implementations of machine learning may rely on matrices, symbolic models, and hierarchical and/or associative data structures. Parameterized (i.e., configurable) implementations of best-of-breed machine learning algorithms may be found in open-source libraries such as Google's TensorFlow for Python and C++ or Georgia Institute of Technology's MLPack for C++. Shogun is an open-source C++ ML library with adapters for several programming languages, including C #, Ruby, Lua, Java, MatLab, R, and Python.

Hyper-Parameters, Cross-Validation and Algorithm Selection

A type of machine algorithm may have unlimited variants based on one or more hyper-parameters. The term "hyperparameter" refers to a parameter in a model artifact that is set before the training of the machine algorithm model and is not modified during the training of the model. In other words, a hyper-parameter is a constant value that affects (or controls) the generated trained model independent of the training data set. A machine learning model with a model artifact that has only hyper-parameter values set is referred to herein as a "variant of a machine learning algorithm" or simply "variant." Accordingly, different hyperparameter values for the same type of machine learning algorithm may yield significantly different loss values on the same training data set during the training of a model.

For example, the SVM machine learning algorithm includes two hyperparameters: "C" and "gamma." The "C" hyper-parameter may be set to any value from $10^{-3}$ to $10^5$, while the "gamma" hyper-parameter may be set from $10^{-5}$ to $10^3$. Accordingly, there are endless permutations of the "C" and "gamma" parameters that may yield different loss values for training the same adult income training data set.

Therefore, to select a type of algorithm or, moreover, to select the best-performing variant of an algorithm, various hyper-parameter selection techniques are used to generate distinct sets of hyper-parameter values. Non-limiting examples of hyper-parameter value selection techniques include a Bayesian optimization such as a Gaussian process for hyper-parameter value selection, a random search, a gradient-based search, a grid search, hand-tuning techniques, a tree-structured Parzen Estimators (TPE) based technique.

With distinct sets of hyper-parameters values selected based on one or more of these techniques, each machine learning algorithm variant is trained on a training data set. A test data set is used as an input to the trained model for calculating the predicted result values. The predicted result values are compared with the corresponding label values to determine the performance score. The performance score may be computed based on calculating the error rate of predicted results in relation to the corresponding labels. For example, in a categorical domain, if out of 10,000 inputs to the model, only 9,000 matched the labels for the inputs, then the performance score is computed to be 90%. In non-categorical domains, the performance score may be further based on a statistical aggregation of the difference between the label value and the predicted result value.

The term "trial" refers herein to the training of a machine learning algorithm using a distinct set of hyper-parameter values and testing the machine learning algorithm using at least one test data set. In an implementation, cross-validation techniques, such as k-fold cross-validation, are used to create many pairs of training and test datasets from an original training data set. Each pair of data sets together contains the original training data set, but the pairs partition the original data set in different ways between a training data set and a test data set. For each pair of data sets, the training data set is used to train a model based on the selected set of hyperparameters, and the corresponding test data set is used for calculating the predicted result values with the trained model. Based on inputting the test data set to the trained machine learning model, the performance score for the pair (or fold) is calculated. If there is more than one pair (i.e., fold), then the performance scores are statistically aggregated (e.g., average, mean, min, max) to yield a final performance score for the variant of the machine learning algorithm.

Each trial is computationally very expensive, as it includes multiple training iterations for a variant of the machine algorithm to generate the performance score for one distinct set of hyper-parameter values of the machine learning algorithm. Accordingly, reducing the number of trials can dramatically reduce the necessary computational resources (e.g., processor time and cycles) for tuning.

Furthermore, since the performance scores are generated to select the most accurate algorithm variant, the more precise the performing score itself is, the more precise the generated model's prediction relative accuracy is compared to other variants. Indeed, once the machine learning algorithm and its hyper-parameter value-based variant are selected, a machine model is trained by applying the algorithm variant to the full training data set using the techniques discussed above. This generated machine-learning model is expected to predict the outcome with more accuracy than the machine-learning models of any other variant of the algorithm.

The precision of the performance score itself depends on how much computational resources are spent on tuning hyper-parameters for an algorithm. Computational resources can be wasted on testing sets of hyper-parameter values that cannot yield the desired accuracy of the eventual model.

Similarly, less (or no) computational resources may be spent on tuning those hyper-parameters for a type of algorithm that is most likely to be less accurate than another type of algorithm. Accordingly, the number of trials may be reduced or eliminated for hyper-parameters of discounted algorithms, thus substantially increasing the performance of the computer system.

Software Overview

Figure 6:
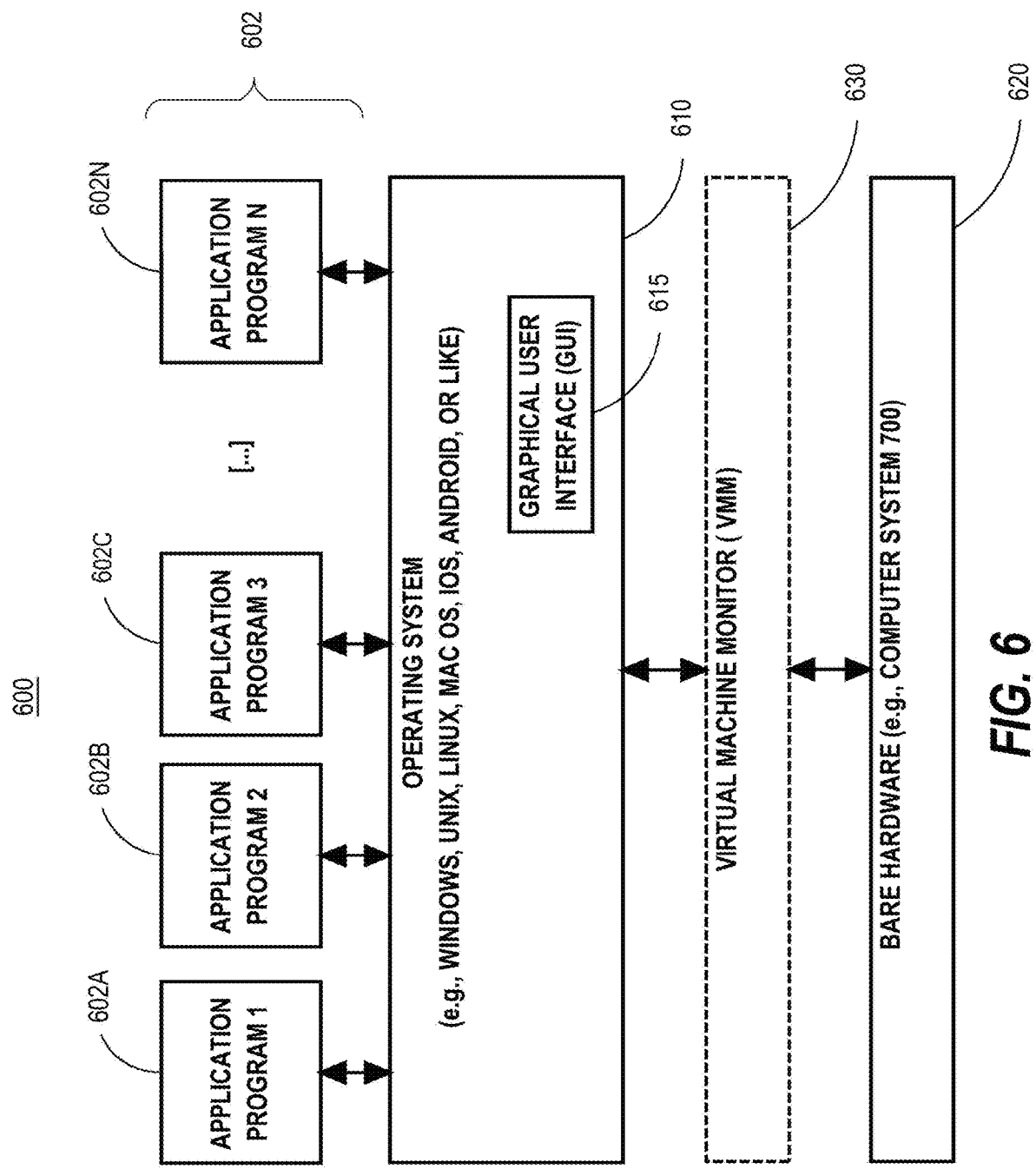
FIG. 6 is a block diagram of a basic software system, in one or more implementations.
Figure 7:
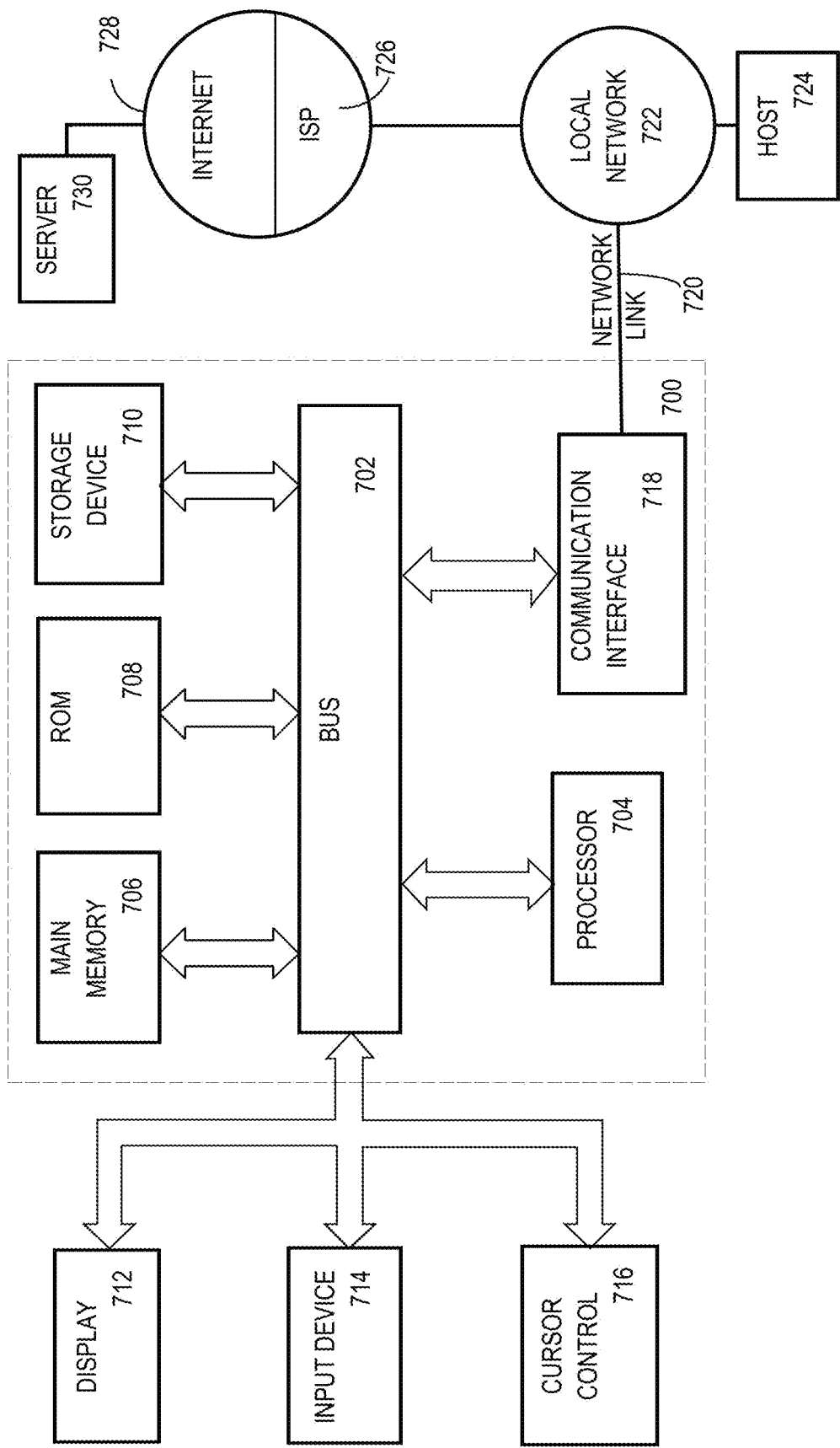
FIG. 7 is a block diagram that illustrates a computer system upon which an implementation of the invention may be implemented.

FIG. 6 is a block diagram of a basic software system 600 that may be employed for controlling the operation of computing system 700 of FIG. 7. Software system 600 and its components, including their connections, relationships, and functions, are meant to be exemplary only and not meant to limit implementations of the example implementation(s). Other software systems suitable for implementing the example implementation(s) may have different components, including components with different connections, relationships, and functions.

Software system 600 is provided for directing the operation of computing system 700. Software system 600, which may be stored in system memory (RAM) 706 and on fixed storage (e.g., hard disk or flash memory) 710, includes a kernel or operating system (OS) 610.

The OS 610 manages low-level aspects of computer operation, including managing execution of processes, memory allocation, file input and output (I/O), and device I/O. One or more application programs represented as 602A, 602B, 602C . . . , and 602N may be "loaded" (e.g., transferred from fixed storage 710 into memory 706) for execution by the system 600. The applications or other software intended for use on computer system 700 may also be stored as a set of downloadable computer-executable instructions, for example, for downloading and installation from an Internet location (e.g., a Web server, an app store, or another online service).

Software system 600 includes a graphical user interface (GUI) 615 for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 704) of computer system 700. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 700.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 700 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but shares access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model that enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community, while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the runtime execution environment). Infrastructure as a Service (IaaS), in which consumers can deploy and run arbitrary software applications and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment are presented for the purpose of illustrating the basic underlying computer components that may be employed for implementing the example implementation(s). The example implementation (s), however, is not necessarily limited to any particular computing environment or computing device configuration. Instead, the example implementation(s) may be implemented in any type of system architecture or processing environment that one skilled in the art, in light of this disclosure, would understand as capable of supporting the features and functions of the example implementation(s) presented herein.

Hardware Overview

According to one implementation, the techniques described herein are implemented by one or more special-purpose computing devices. The special-purpose computing devices may be hard-wired to perform the techniques or may include digital electronic devices such as one or more application-specific integrated circuits (ASICs) or field-programmable gate arrays (FPGAs) that are persistently programmed to perform the techniques or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an implementation of the invention may be implemented. Computer system 700 includes a bus 702 or other communication mechanism for communicating information and a hardware processor 704 coupled with bus 702 for processing information. Hardware processor 704 may be, for example, a general-purpose microprocessor.

Computer system 700 also includes a main memory 706, such as a random access memory (RAM) or another dynamic storage device, coupled to bus 702 for storing information and instructions to be executed by processor 704. Main memory 706 may also be used for storing temporary variables or other intermediate information during the execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read-only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer System 700 may implement the techniques described herein using customized hard-wired logic, one or more ASICs or FPGAs, firmware, and/or program logic, which, in combination with the computer system, causes or programs Computer System 700 to be a special-purpose machine. According to one implementation, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative implementations, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, a hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 702. Transmission media can also take the form of acoustic or light waves, such as those generated during radio-wave and infrared data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infra-red detector can receive the data carried in the infra-red signal, and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726, in turn, provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, server 730 might transmit a requested code for an application program through Internet 728, ISP 726, local network 722, and communication interface 718.

The received code may be executed by processor 704 as it is received and/or stored in storage device 710 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. One or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple-core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit on another of the nodes. The network may be configured to support remote direct memory access.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving first input music sequence data that is based, at least in part, on acquiring a first portion of an original audio music signal in real-time at least by sampling the original audio music signal;
based at least in part on the first input music sequence data, generating, by a machine learning (ML) model, first output music sequence data for an output music signal;
while receiving third input music sequence data that is based, at least in part, on acquiring a third portion of the original audio music signal in real-time, which is temporally after the first portion and a second portion of the original audio music signal:
generating, by the ML model, second output music sequence data, for the output music signal, based at least in part on a previously generated particular portion of the first output music sequence data;
temporally aligning the first output music sequence data of the output music signal with the third portion of the original audio music signal;
wherein the second output music sequence data is temporally after the first output music sequence data of the output music signal.

2. The method of claim 1, further comprising:
receiving second input music sequence data that corresponds to the second portion of the original audio music signal;
generating, by the ML model, the second output music sequence data, for the output music signal, based at least in part on the previously generated particular portion of the first output music sequence data and the second input music sequence data;
wherein the second portion is temporally after the first portion of the original audio music signal and before the third portion of the original audio music signal.

3. The method of claim 1, further comprising:
determining one or more first music metric values of the first input music sequence data;
configuring the ML model to generate the second output music sequence data based at least in part on the first one or more music metric values.

4. The method of claim 3, wherein the first music metric values are metric value of polyphony or intensity.

5. The method of claim 1, further comprising:
determining one or more first music metric values of the first input music sequence data;
configuring the ML model to generate the first output music sequence data based at least in part on the first one or more music metric values;
receiving second input music sequence data that corresponds to the second portion of the original audio music signal;
determining one or more second music metric values of the second input music sequence data;
reconfiguring the ML model to generate the second output music sequence data based at least in part on the second one or more music metric values.

6. The method of claim 1, further comprising:
receiving a configuration metric value for variance;
receiving second input music sequence data that corresponds to the second portion of the original audio music signal;
generating, by the ML model, the second output music sequence data, for the output music signal, based at least in part on the previously generated particular portion of the first music output sequence data and the second input music sequence data;
wherein the previously generated particular portion of the first music output sequence data is a portion of the first music output sequence data in amount of the configuration metric value for variance.

7. The method of claim 1, further comprising:
receiving a beats-per-minute metric value for the output music signal;
determining a bar time duration for the output music signal based at least in part on the beats-per-minute metric value;
wherein the first portion of the original audio music signal corresponds to a particular number of bar time durations.

8. The method of claim 1, wherein the ML model is a large language model (LLM), the first input music sequence data is a first input sequence of music tokens and the first output music sequence data is a first output sequence of music tokens, the method further comprising:
receiving a first sequence of MIDI data for the first portion of the original audio music signal;

determining the first input sequence of music tokens based at least in part on the first sequence of MIDI data;

generating, by the LLM model, the first output sequence of music tokens, for the output music signal, based at least in part on the previously generated particular portion of the first output music sequence data.

9. The method of claim 8, wherein the LLM is trained to generate an output sequence of music tokens given an input sequence of music tokens at least by adjusting parameters of the LLM to reduce error of generating a known output sequence of tokens that correspond to next input sequence of tokens.

10. The method of claim 8, further comprising:
determining time delay between a first MIDI event and a second MIDI event in the first sequence of MIDI data;
generating a music token for the time delay that is in between a music token for the first MIDI event and a music token for the second MIDI event.

11. The method of claim 8, further comprising:
determining one or more first music metric values of the first input music sequence data;
generating one or more music tokens that indicate the one or more first music metric values in the first input sequence of music tokens.

12. One or more non-transitory computer-readable media storing a set of instructions, wherein the set of instructions includes instructions, which when executed by one or more processors, cause:
receiving first input music sequence data that is based, at least in part, on acquiring a first portion of an original audio music signal in real-time at least by sampling the original audio music signal;
based at least in part on the first input music sequence data, generating, by a machine learning (ML) model, first output music sequence data for an output music signal;
while receiving third input music sequence data that is based, at least in part, on acquiring a third portion of the original audio music signal in real-time, which is temporally after the first portion and a second portion of the original audio music signal:
generating, by the ML model, second output music sequence data, for the output music signal, based at least in part on a previously generated particular portion of the first output music sequence data;
temporally aligning the first output music sequence data of the output music signal with the third portion of the original audio music signal;
wherein the second output music sequence data is temporally after the first output music sequence data of the output music signal.

13. The one or more non-transitory computer-readable media of claim 12, wherein the set of instructions further includes instructions, which when executed by said one or more processors, cause:
receiving second input music sequence data that corresponds to the second portion of the original audio music signal;
generating, by the ML model, the second output music sequence data, for the output music signal, based at least in part on the previously generated particular portion of the first output music sequence data and the second input music sequence data;
wherein the second portion is temporally after the first portion of the original audio music signal and before the third portion of the original audio music signal.

14. The one or more non-transitory computer-readable media of claim 12, wherein the set of instructions further includes instructions, which when executed by said one or more processors, cause:
determining one or more first music metric values of the first input music sequence data;
configuring the ML model to generate the second output music sequence data based at least in part on the first one or more music metric values.

15. The one or more non-transitory computer-readable media of claim 12, wherein the set of instructions further includes instructions, which when executed by said one or more processors, cause:
receiving a configuration metric value for variance;
receiving second input music sequence data that corresponds to the second portion of the original audio music signal;
generating, by the ML model, the second output music sequence data, for the output music signal, based at least in part on the previously generated particular portion of the first music output sequence data and the second input music sequence data;
wherein the previously generated particular portion of the first music output sequence data is a portion of the first music output sequence data in amount of the configuration metric value for variance.

16. The one or more non-transitory computer-readable media of claim 12, wherein the ML model is a large language model (LLM), the first input music sequence data is a first input sequence of music tokens and the first output music sequence data is a first output sequence of music tokens, and wherein the set of instructions further includes instructions, which when executed by said one or more processors, cause:
receiving a first sequence of MIDI data for the first portion of the original audio music signal;
determining the first input sequence of music tokens based at least in part on the first sequence of MIDI data;
generating, by the LLM model, the first output sequence of music tokens, for the output music signal, based at least in part on the previously generated particular portion of the first output music sequence data.

17. A system comprising one or more processors and one or more storage media storing one or more computer programs for execution by the one or more processors, wherein the one or more computer programs, when executed by the one or more processors, cause:
receiving first input music sequence data that is based, at least in part, on acquiring a first portion of an original audio music signal in real-time at least by sampling the original audio music signal;
based at least in part on the first input music sequence data, generating, by a machine learning (ML) model, first output music sequence data for an output music signal;
while receiving third input music sequence data that is based, at least in part, on acquiring a third portion of the original audio music signal in real-time, which is temporally after the first portion and a second portion of the original audio music signal:
generating, by the ML model, second output music sequence data, for the output music signal, based at least in part on a previously generated particular portion of the first output music sequence data;
temporally aligning the first output music sequence data of the output music signal with the third portion of the original audio music signal;

wherein the second output music sequence data is temporally after the first output music sequence data of the output music signal.

18. The system of claim 17, wherein the one or more programs, when executed by said one or more processors, further cause:

receiving second input music sequence data that corresponds to the second portion of the original audio music signal;

generating, by the ML model, the second output music sequence data, for the output music signal, based at least in part on the previously generated particular portion of the first output music sequence data and the second input music sequence data;

wherein the second portion is temporally after the first portion of the original audio music signal and before the third portion of the original audio music signal.

19. The system of claim 17, wherein the one or more programs, when executed by said one or more processors, further cause:

determining one or more first music metric values of the first input music sequence data;

configuring the ML model to generate the second output music sequence data based at least in part on the first one or more music metric values.

20. The system of claim 17, wherein the one or more programs, when executed by said one or more processors, further cause:

receiving a configuration metric value for variance;

receiving second input music sequence data that corresponds to the second portion of the original audio music signal;

generating, by the ML model, the second output music sequence data, for the output music signal, based at least in part on the previously generated particular portion of the first music output sequence data and the second input music sequence data;

wherein the previously generated particular portion of the first music output sequence data is a portion of the first music output sequence data in amount of the configuration metric value for variance.

21. The system of claim 17, wherein the ML model is a large language model (LLM), the first input music sequence data is a first input sequence of music tokens and the first output music sequence data is a first output sequence of music tokens, and wherein the one or more programs, when executed by said one or more processors, further cause:

receiving a first sequence of MIDI data for the first portion of the original audio music signal;

determining the first input sequence of music tokens based at least in part on the first sequence of MIDI data;

generating, by the LLM model, the first output sequence of music tokens, for the output music signal, based at least in part on the previously generated particular portion of the first output music sequence data.

\* \* \* \* \*